US008841882B2

(12) United States Patent
Sato

(10) Patent No.: US 8,841,882 B2
(45) Date of Patent: Sep. 23, 2014

(54) ELECTRONIC APPARATUS

(75) Inventor: Koichi Sato, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 13/302,812

(22) Filed: Nov. 22, 2011

(65) Prior Publication Data

US 2012/0235635 A1 Sep. 20, 2012

(30) Foreign Application Priority Data

Mar. 18, 2011 (JP) ................................ 2011-061542

(51) Int. Cl.
*H02J 7/00* (2006.01)

(52) U.S. Cl.
USPC ........................................................ 320/114

(58) Field of Classification Search
USPC ........................................................ 320/108
See application file for complete search history.

(56) References Cited

U.S. PATENT DOCUMENTS

| | | | | |
|---|---|---|---|---|
| 7,639,190 | B2 | 12/2009 | Shimasaki et al. | |
| 7,956,813 | B2 | 6/2011 | Arima et al. | |
| 2003/0210194 | A1* | 11/2003 | Gilmore | 343/725 |
| 2005/0200537 | A1* | 9/2005 | Jarmuszewski et al. | 343/702 |
| 2006/0109184 | A1* | 5/2006 | Chen et al. | 343/702 |
| 2007/0273594 | A1 | 11/2007 | Shimasaki et al. | |
| 2008/0284663 | A1 | 11/2008 | Arima et al. | |
| 2009/0016418 | A1* | 1/2009 | Silver et al. | 375/220 |
| 2009/0251372 | A1* | 10/2009 | Degner et al. | 343/702 |
| 2010/0013720 | A1* | 1/2010 | Sakata et al. | 343/702 |
| 2010/0045540 | A1* | 2/2010 | Lai et al. | 343/702 |
| 2010/0060531 | A1* | 3/2010 | Rappaport | 343/702 |
| 2010/0073242 | A1* | 3/2010 | Ayala Vazquez et al. | 343/702 |
| 2010/0090909 | A1* | 4/2010 | Ella | 343/702 |
| 2010/0156741 | A1* | 6/2010 | Vazquez et al. | 343/846 |
| 2011/0109517 | A1 | 5/2011 | Arima et al. | |

FOREIGN PATENT DOCUMENTS

| | | |
|---|---|---|
| JP | 10164250 | 6/1998 |
| JP | 2007166763 | 6/2007 |
| JP | 2007317125 | 12/2007 |
| JP | 2008141481 | 6/2008 |
| JP | 2008288801 | 11/2008 |
| JP | 4389540 | 10/2009 |
| JP | 2010045698 | 2/2010 |

OTHER PUBLICATIONS

Japanese Patent Application No. 2012-055837, First Office Action, mailed Jul. 30, 2013, (with English Translation).
Japanese Patent Application No. 2012-055837, Final Office Action, mailed Oct. 15, 2013, (with English Translation).

* cited by examiner

*Primary Examiner* — Arun Williams
(74) *Attorney, Agent, or Firm* — Blakely, Sokoloff, Taylor & Zafman LLP

(57) ABSTRACT

According to one embodiment, an electronic apparatus includes a display device with a display screen, a first wireless communication module, a second wireless communication module, first antennas for the first wireless communication module, and second antennas for the second wireless communication module. The display screen is exposed from a front surface of a housing. At least two of each of the first antennas and the second antennas are disposed in two perpendicular sides of the housing. The two perpendicular sides are peripheral parts of the display screen. One of the first antennas disposed in the two perpendicular sides and one of the second antennas disposed in the two perpendicular sides are disposed in respective center parts of the two perpendicular sides.

11 Claims, 11 Drawing Sheets

ELECTRONIC APPARATUS

CROSS-REFERENCE TO RELATED APPLICATIONS

This application is based upon and claims the benefit of priority from prior Japanese Patent Application No. 2011-061542, filed Mar. 18, 2011, the entire contents of which are incorporated herein by reference.

FIELD

Embodiments described herein relate generally to an electronic apparatus which includes a wireless communication function, and can be used in a state of being held in one hand or both hands.

BACKGROUND

In recent years, electronic apparatuses which include a handwriting input function and are called "tablet terminals" are coming into widespread use. In addition, it is becoming general that electronic apparatuses of this type include a wireless communication function. With an electronic apparatus of this type, the user can transmit and receive electronic mail and browse web pages, even while the user is outside or on the move.

Therefore, it may be considered that electronic apparatuses of this type are used in a state of being held by the user in a train or the like. In view of such a use, various mechanisms for forming an antenna such that good wireless communication can be performed even in a state where the apparatus is held by the user have been proposed until now.

In the meantime, recently, electronic apparatuses which have a thin board-like housing, and in which a touch panel display provided on the front surface of the housing can be used in both portrait (Y-axis disposed longitudinally) and landscape (X-axis disposed longitudinally) orientation are increased. The electronic apparatuses can be held in one hand or both hands. In addition, an increasing number of electronic apparatuses are equipped with a wireless communication system to use a cellular communication service (including at least one of voice communication and data communication), a wireless communication system to use public wireless LAN service, and a wireless communication system to perform wireless communication with peripheral devices.

With such changes, it is required to take measures to allow each of the wireless communication systems to always perform wireless communication in a good state, regardless of the orientation of the electronic apparatuses and the holding state (in one hand or both hands) of the electronic apparatuses, specifically, no matter which part of the housing is held.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus includes a display device with a display screen, a first wireless communication module, a second wireless communication module, first antennas for the first wireless communication module, and second antennas for the second wireless communication module. The display screen is exposed from a front surface of a housing. At least two of each of the first antennas and the second antennas are disposed in two perpendicular sides of the housing. The two perpendicular sides are peripheral parts of the display screen. One of the first antennas disposed in the two perpendicular sides and one of the second antennas disposed in the two perpendicular sides are disposed in respective center parts of the two perpendicular sides.

First Embodiment

First, a first embodiment will be explained hereinafter.

Figure 1:
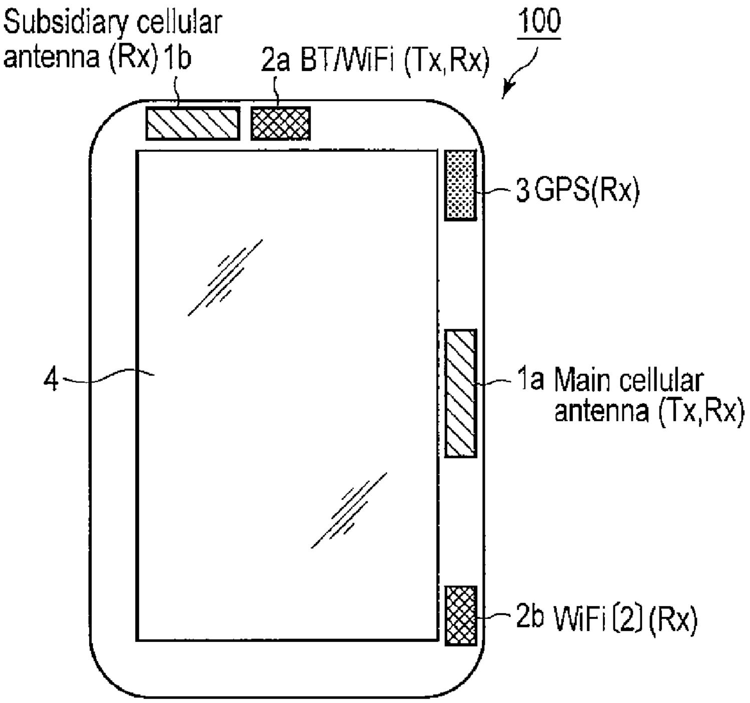
FIG. 1 is an exemplary diagram illustrating a first antenna arrangement example of an electronic apparatus according to a first embodiment.

FIG. 1 is an exemplary diagram illustrating the external appearance and antenna arrangement of an electronic apparatus 100 according to the first embodiment. The electronic apparatus 100 is realized as a portable information terminal which is called a "tablet terminal" and receives data inputs by a touch panel display 4.

The electronic apparatus 100 has a thin board-like housing. The user can perform various data input operations such as click operation and handwriting input operation, by touching the touch panel display 4 located in the center of a front surface of the housing by a pen or the like. Input to the touch panel display 4 can be also performed by, for example, a finger. A display screen of the touch panel display 4 has a size of, for example, 7 inches (which occupies at least half of the area of the front surface of the housing). Therefore, the electronic apparatus 100 is a portable information terminal of a type which is used by holding an end portion of the housing in both hands or one hand, not a type which is used in the palm such as a "palm-size" portable information terminal. In addition, the electronic apparatus 100 can be used in both portrait orientation (in which the Y-axis is disposed longitudinally) and landscape orientation (in which the X-axis is disposed longitudinally).

Although the present embodiment shows an example in which the electronic apparatus 100 is equipped with the touch panel display 4 which includes a data input function as a display device, the present embodiment is not limited to it. For example, it is possible to equip the electronic apparatus 100 with a liquid crystal display (LCD) or the like which does not include data input function, and provide the electronic apparatus 100 with a data input module such as a pointing device separately.

The electronic apparatus 100 also includes a wireless communication system for using a cellular communication service, a wireless communication system for using a public wireless LAN service, and a wireless communication system for performing wireless communication with peripheral devices. As wireless communication system antennas for using a cellular communication service, the electronic apparatus 100 is equipped with a transmission/reception (Tx, Rx) main cellular antenna 1*a* and a reception (Rx) subsidiary cellular antenna 1*b*. In addition, as antennas for the wireless communication system for using a public wireless LAN service and the wireless communication system for performing wireless communication with peripheral devices, the electronic apparatus 100 is equipped with a transmission/reception Bluetooth (registered trademark)/WiFi (BT/WiFi) antenna 2*a* and a reception WiFi [2] antenna 2*b*. In addition, the electronic apparatus 100 includes a Global Positioning System (GPS) function and is equipped with a GPS antenna 3 for the GPS function.

As described above, the electronic apparatus 100 is a portable information terminal of a type which is used by holding an end portion of the housing in both hands or one hand, and the touch panel display 4 can be used in both portrait orientation and landscape orientation. In addition, as illustrated in FIG. 1, the electronic apparatus 100 has a structure in which the touch panel display 4 (in which the display screen has a size occupying half or more of the area of the front surface of the housing) is located in the center of the front surface of the housing, and the housing has a thin board-like shape. Therefore, the main cellular antenna 1*a*, the subsidiary cellular antenna 1*b*, the Bluetooth/WiFi antenna 2*a*, the WiFi [2] antenna 2*b*, and the GPS antenna 3 are inevitably arranged in the end portion of the housing, which is a peripheral part of the touch panel display 4 and may be held in the hands.

Under such conditions, the electronic apparatus 100 has a mechanism which suppresses deterioration in antenna characteristics in the case of being held by the user, such that each of the wireless communication systems can perform wireless communication in a good state even when the electronic apparatus is held in any orientation, and held either in one hand or both hands, specifically, even when any part of the housing is held. The following is explanation of this point.

First, as illustrated in FIG. 1, the electronic apparatus 100 has a structure in which at least one of the main cellular antenna 1*a* and the subsidiary cellular antenna 1*b* for the wireless communication system for using a cellular communication service and at least one of the Bluetooth/WiFi antenna 2*a* and the WiFi [2] antenna 2*b* for the wireless communication system for performing wireless communication with peripheral devices are arranged in respective center parts of two different sides, which are perpendicular to each other, of the housing.

Secondly, the electronic apparatus 100 has a structure in which at least one of the other antennas (other than the antennas disposed in the respective center parts of the two sides) of each of the two wireless communication systems is disposed in the side where the antenna of the other wireless communication system is disposed in the center part, and the other antenna is disposed in an area which is beyond the center part of the side as viewed from the side where the other antenna of the same system is disposed in the center part.

More specifically, first, among the two antennas of the main cellular antenna 1*a* and the subsidiary cellular antenna 1*b*, the main cellular antenna 1*a* is disposed in the center part of a longitudinal side of the housing. In addition, among the two antennas of the Bluetooth/WiFi antenna 2*a* and the WiFi [2] antenna 2*b*, the Bluetooth/WiFi antenna 2*a* is disposed in the center part of a side which is perpendicular to the side in which the main cellular antenna 1*a* is disposed in the center part. Among the two antennas of each wireless communication system, the antenna which is used for transmission (in addition to reception) is preferably selected as the antenna to be disposed in the center part of the side, rather than the antenna used for only reception.

In addition, secondly, the subsidiary cellular antenna 1*b* is disposed in a part of the side where the Bluetooth/WiFi antenna 2*a* is disposed in the center part, and the part is more distant from the main cellular antenna 1*a* than the Bluetooth/WiFi antenna 2*a* is. In addition, the WiFi [2] antenna 2*b* is disposed in a part of the side where the main cellular antenna 1*a* is disposed in the center part, and the part is more distant from the Bluetooth/WiFi antenna 2*a* than the main cellular antenna 1*a* is.

The GPS antenna 3 is disposed in a part of the side (the longitudinal side of the housing, in which a space can be easily secured) where the main cellular antenna 1*a* is disposed in the center part, and the part is opposed to the WiFi [2] antenna 2*b* with the main cellular antenna 1 interposed therebetween.

Figure 2:
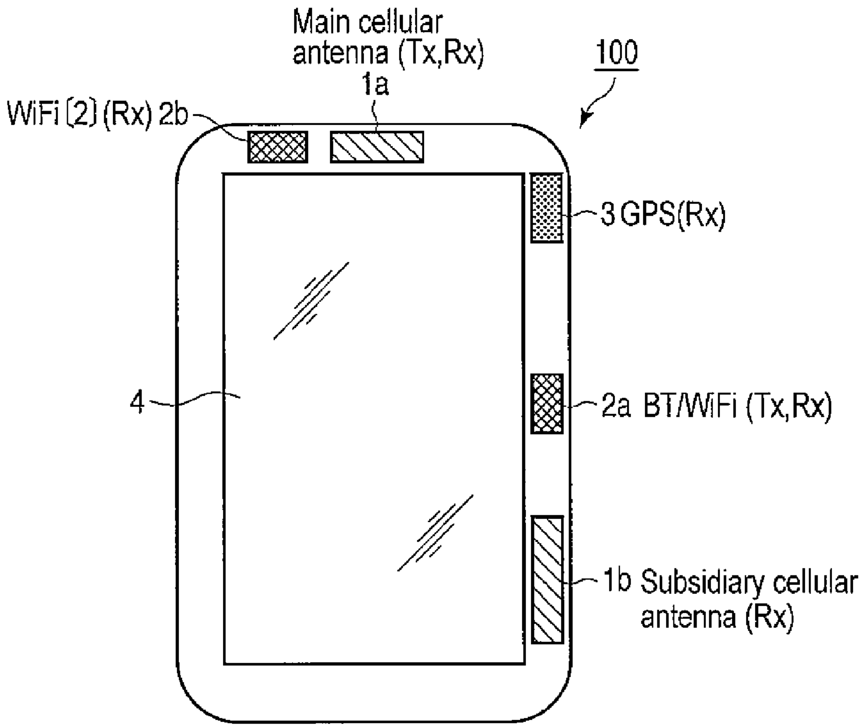
FIG. 2 is an exemplary diagram illustrating a second antenna arrangement example of the electronic apparatus according to the first embodiment.

As illustrated in FIG. 2, the positions of the pair of the main cellular antenna 1*a* and the subsidiary cellular antenna 1*b* and the pair of the Bluetooth/WiFi antenna 2*a* and the WiFi [2] antenna 2*b* can be exchanged with each other.

Figure 3:
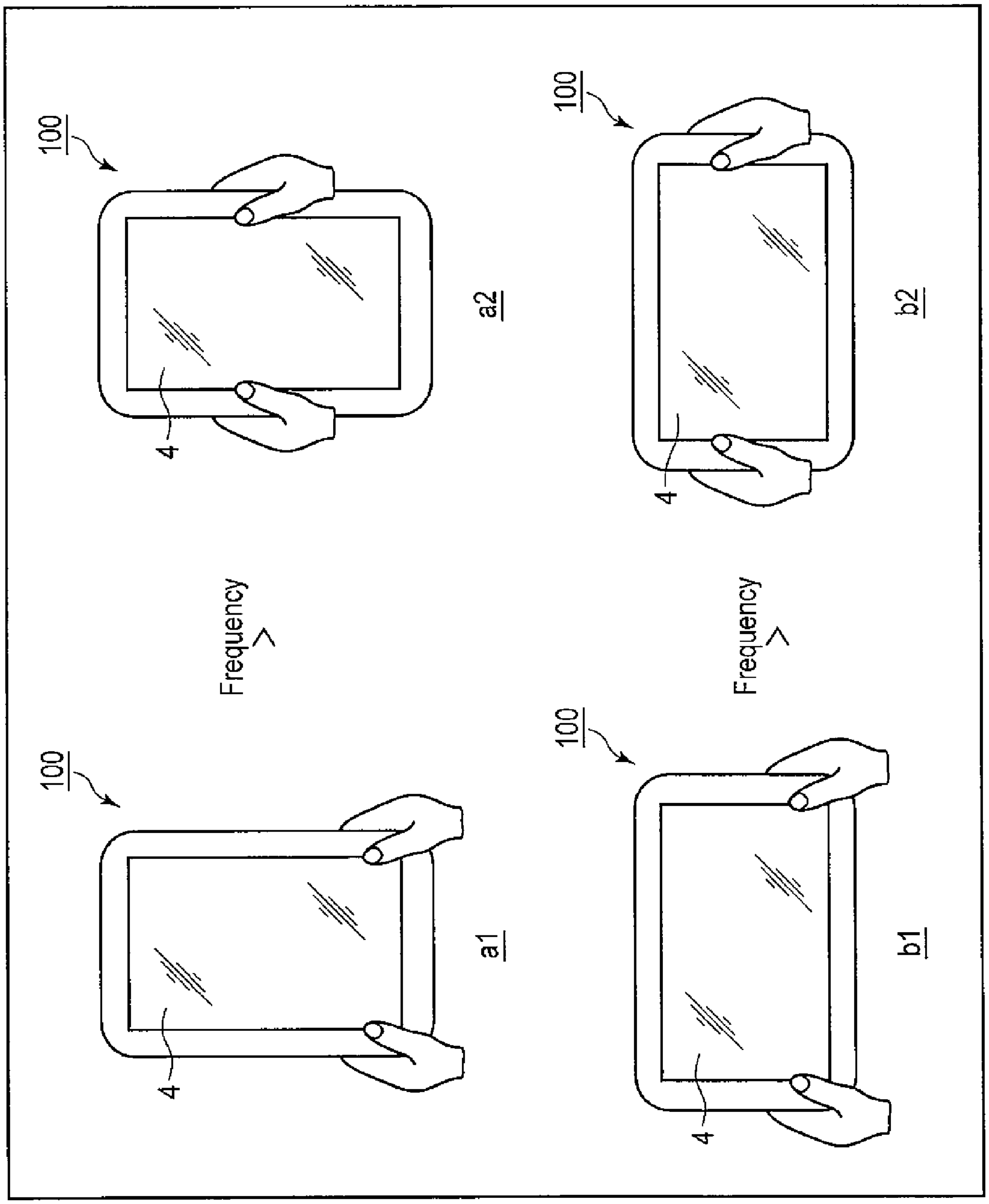
FIG. 3 is an exemplary diagram for explaining forms in which the electronic apparatus of the first embodiment is used in a state of being held in both hands.
Figure 4:
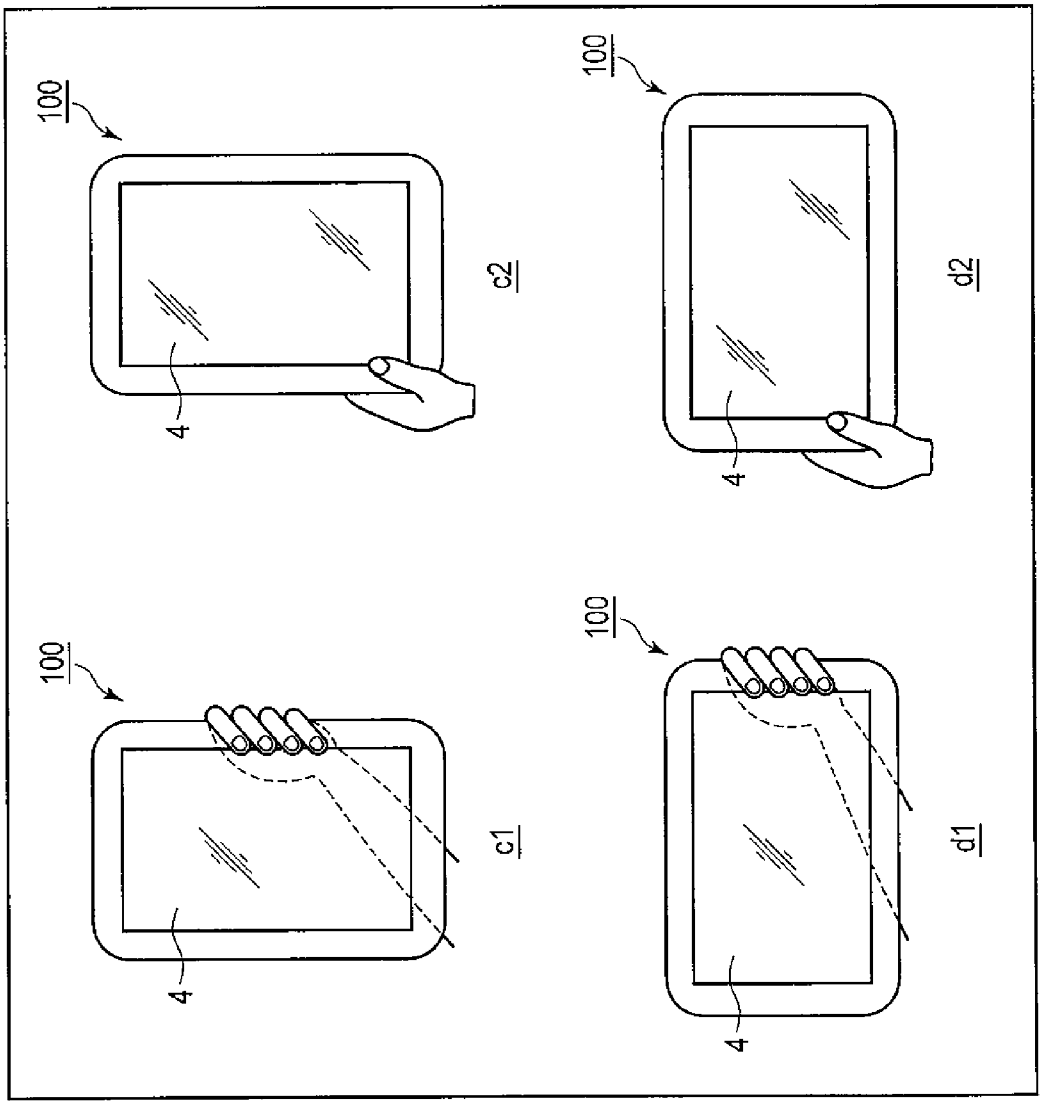
FIG. 4 is an exemplary diagram for explaining forms in which the electronic apparatus of the first embodiment is used in a state of being held in one hand.

The following is explanation of a basic idea of antenna arrangement in the electronic apparatus 100 illustrated in FIG. 1 and FIG. 2, with reference to FIG. 3 and FIG. 4 in addition to FIG. 1 and FIG. 2.

FIG. 3 is an exemplary diagram for explaining forms in which the electronic apparatus 100 is used by being held in both hands. In FIG. 3, forms "a1" and "a2" show the cases where the touch panel display 4 is used in portrait orientation, and forms "b1" and "b2" show the cases where the touch panel display 4 is used in landscape orientation.

As illustrated in FIG. 3, when the electronic apparatus 100 is used in a state of being held in both hands, it may be considered that opposed two sides of the housing are held, in either of the cases where the touch panel display 4 is used in portrait and landscape orientations. In addition, it may be inferred that the lower parts of the two sides are held rather than the center parts thereof. Therefore, at least one antenna of each wireless communication system is disposed in the center part of a side, and thereby it is possible to increase the possibility that the antenna is not covered by a hand. In addition, the two antennas of each wireless communication system are arranged in two perpendicular sides, and thereby it is possible to maintain at least one of the antennas in a state of not being covered by a hand even when the center part (which is presumed to be rarely held) is held.

The reason why "the antenna which is used for transmission (in addition to reception) is preferably selected as antenna to be disposed in the center part of the side, rather than the antenna used only for reception, among the two antennas of each wireless communication system" is based on inference that the lower end parts are possibly held rather than the center parts of the sides as described above.

FIG. 4 is an exemplary diagram for explaining forms in which the electronic apparatus 100 is used in a state of being held in one hand. In FIG. 4, forms "c1" and "c2" show the cases where the touch panel display 4 is used in portrait orientation, and forms "d1" and "d2" show the cases where the touch panel display 4 is used in landscape orientation.

As illustrated in FIG. 4, when the electronic apparatus 100 is used in a state of being held in one hand, two parts of the end parts of the housing are not covered by the hand simultaneously. Therefore, according to the antenna arrangement of the electronic apparatus 100 in which the two antennas of each wireless communication system are arranged in two perpendicular sides, at least one of the antennas is maintained in a state not being covered by the hand.

Figure 5:
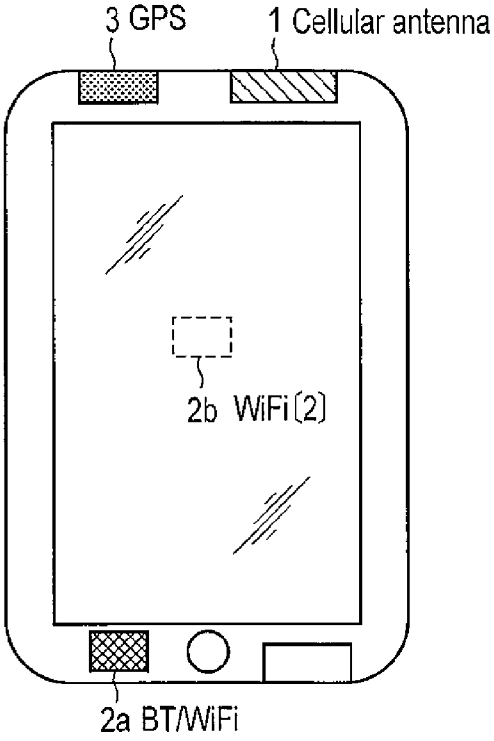
FIG. 5 is an exemplary diagram illustrating a first example of general antenna arrangement in an electronic apparatus equipped with two wireless communication systems.
Figure 6:
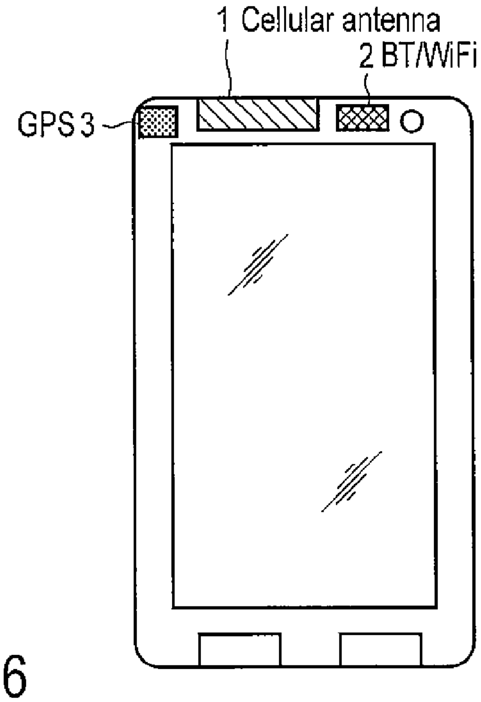
FIG. 6 is an exemplary diagram illustrating a second example of general antenna arrangement in an electronic apparatus equipped with two wireless communication systems.

FIG. 5 and FIG. 6 are exemplary diagrams illustrating examples of general antenna arrangement in electronic apparatuses equipped with two wireless communication systems.

In the electronic apparatus illustrated in FIG. 5, antennas (1, 2*a*) of the two wireless communication systems are arranged in two different sides, which are opposed to each other, of the housing. In addition, in an electronic apparatus illustrated in FIG. 6, antennas (1, 2) of two wireless communication systems are arranged in the same side of the housing. In both of the two electronic apparatuses, the antenna of either wireless communication system is covered by a hand, according to the way of holding the electronic apparatus, and deterioration in antenna characteristic is caused.

In comparison with this, according to the electronic apparatus 100 as illustrated in FIG. 1 or FIG. 2, which adopts antenna arrangement that satisfies: (1) at least one antenna of each wireless communication system is disposed in a center part of a side; and (2) two antennas of each wireless communication system are arranged in two perpendicular sides, deterioration in antenna characteristics is not caused for any of the wireless communication systems.

As described above, the electronic apparatus 100 realizes suppression of deterioration in antenna characteristics in the case of being held by the user.

The present embodiment shows an example where the subsidiary cellular antenna 1*b* is disposed in a part of the side where the Bluetooth/WiFi antenna 2*a* is disposed in the center part and the part is more distant from the main cellular antenna 1*a* than the Bluetooth/WiFi antenna 2*a* is, and the WiFi [2] antenna 2*b* is disposed in a part of the side where the main cellular antenna 1*a* is disposed in the center part, and the part is more distant from the Bluetooth/WiFi antenna 2*a* than the main cellular antenna 1*a* is. This structure is adopted to secure the distance between the main cellular antenna 1*a* and the subsidiary cellular antenna 1*b*, and the distance between the Bluetooth/WiFi antenna 2*a* and the WiFi [2] antenna 2*b* (to increase isolation between the antennas by increasing the distance between them).

Figure 7:
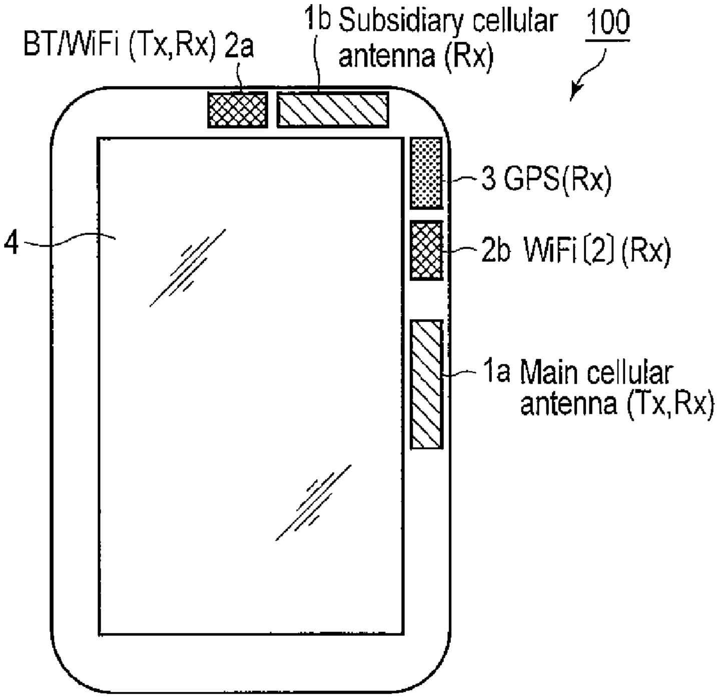
FIG. 7 is an exemplary diagram illustrating a modification of the first antenna arrangement example of the electronic apparatus according to the first embodiment.
Figure 8:
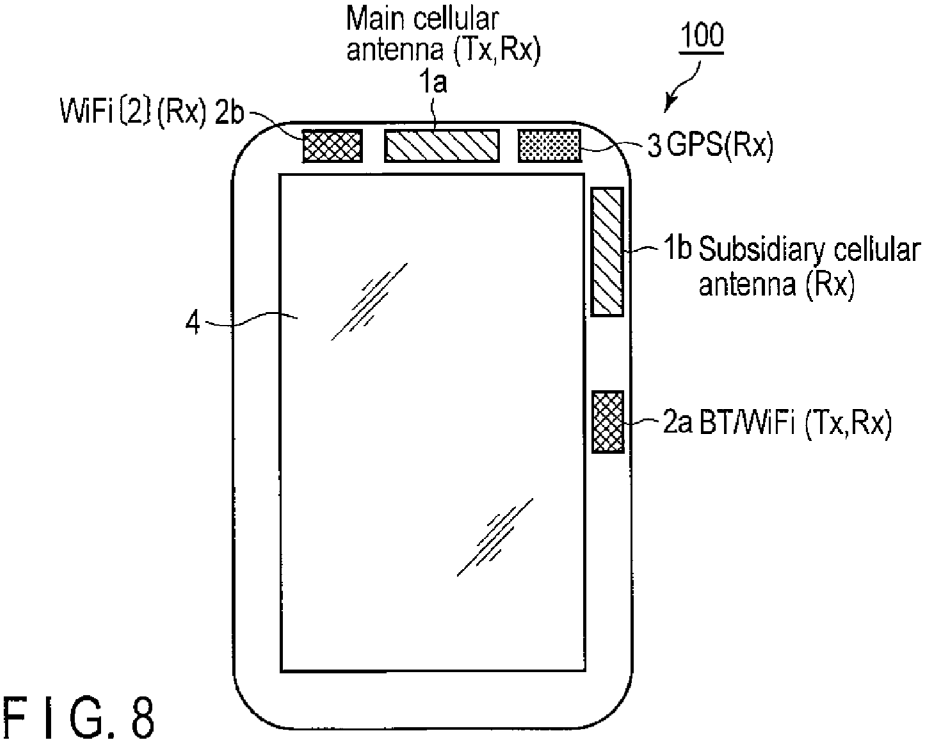
FIG. 8 is an exemplary diagram illustrating a modification of the second antenna arrangement example of the electronic apparatus according to the first embodiment.

On the other hand, an antenna characteristic of each antenna also depends on, for example, the form of the ground pattern. Therefore, for example, by controlling the form of the ground pattern, it is possible to adopt intensive antenna arrangement as illustrated in FIG. 7 and FIG. 8, in which the subsidiary cellular antenna 1*b* and the WiFi [2] antenna 2*b* are arranged in respective parts of the sides (where the Bluetooth/WiFi antenna 2*a* and the main cellular antenna 1*a* are disposed respectively), and the parts are closer to the main cellular antenna 1*a* and the Bluetooth/WiFi antenna 2*a*, respectively.

Specifically, the essence of the electronic apparatus 100 is arranging two antennas of each wireless communication system in two perpendicular sides, and at least one antenna of each wireless communication system in the center part of the side, and the electronic apparatus 100 is not limited to arranging the other antenna than the antenna disposed in the center part separately from the antenna disposed in the center part.

Second Embodiment

Next, a second embodiment will be explained hereinafter.

Figure 9:
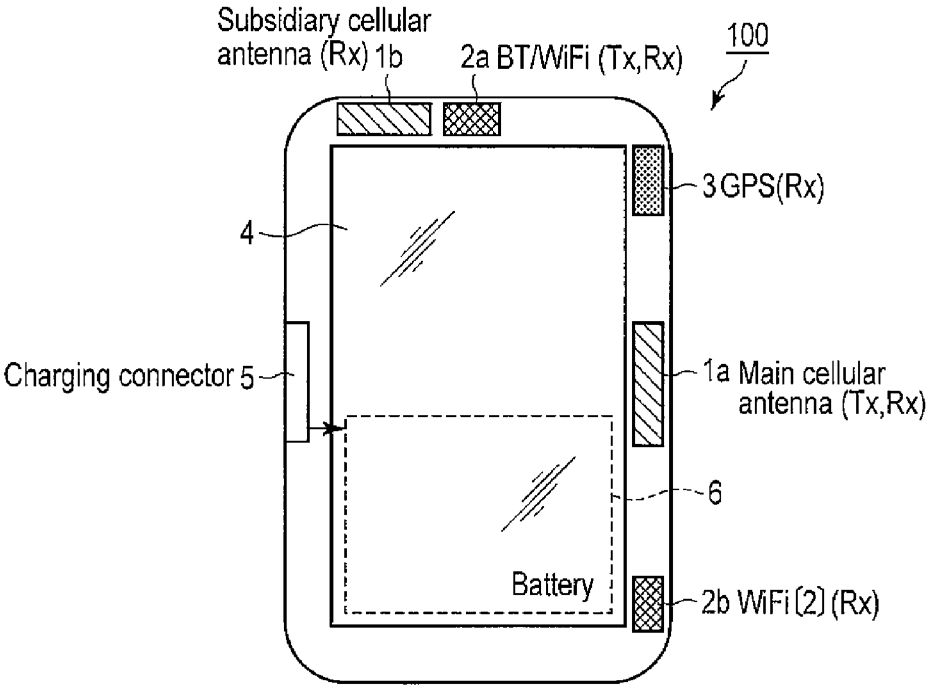
FIG. 9 is an exemplary diagram illustrating a first antenna arrangement example of an electronic apparatus according to a second embodiment.

FIG. 9 is an exemplary diagram illustrating an external appearance and antenna arrangement of an electronic apparatus 100 according to the present embodiment.

As illustrated in FIG. 9, the electronic apparatus 100 is provided with a charging connector 5 in a side surface of the housing. The charging connector 5 is provided to input electrical energy for charging a battery 6 which is included in the electronic apparatus 100 as power source. The charging connector 5 is formed to be connected to a connector of a charging device or an expansion unit, when the electronic apparatus 100 is connected to the charging device or the expansion unit which has a charging function such as a docker.

In addition, in the electronic apparatus 100, a transmission and reception main cellular antenna 1*a* is disposed in a side opposed to a side in which the charging connector 5 is disposed. In other words, the side in which the main cellular antenna 1*a* is disposed is a side which is opposed to the side in which the charging connector 5 is disposed.

Suppose that wireless communication is performed in a state where the electronic apparatus 100 is connected to the charging device or the expansion unit. Disposing the main cellular antenna 1*a* in a side opposed to the side in which the charging connector 5 is disposed can suppress deterioration in antenna characteristic of the main cellular antenna 1*a* in the state where the electronic apparatus 100 is connected to the charging device or the expansion unit.

Figure 10:
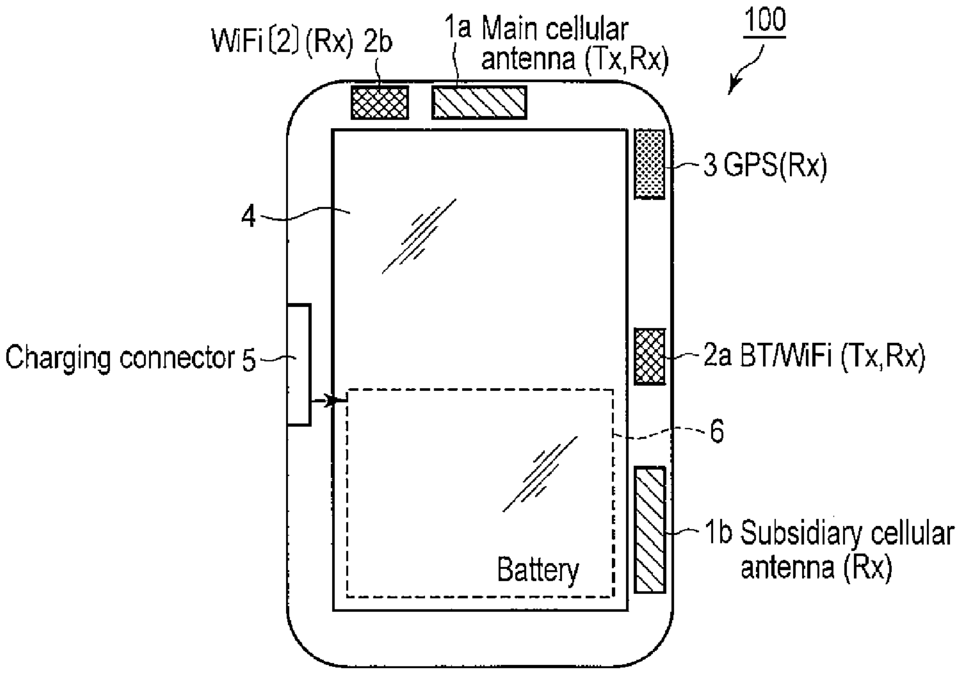
FIG. 10 is an exemplary diagram illustrating a second antenna arrangement example of the electronic apparatus according to the second embodiment.

In addition, as illustrated in FIG. 10, positions of the pair of the main cellular antenna 1*a* and a subsidiary cellular antenna 1*b* and the pair of a Bluetooth/WiFi antenna 2*a* and a WiFi [2] antenna 2*b* can be exchanged. For example, in the case of giving priority to the wireless communication system using the main cellular antenna 1*a* over the wireless communication system using the Bluetooth/WiFi antenna 2*a*, it is preferable to adopt the antenna arrangement illustrated in FIG. 9. On the other hand, in the case of giving priority to the wireless communication system using the Bluetooth/WiFi antenna 2*a* over the wireless communication system using the main cellular antenna 1*a*, it is preferable to adopt the antenna arrangement illustrated in FIG. 10.

Third Embodiment

Next, a third embodiment will be explained hereinafter.

Figure 11:
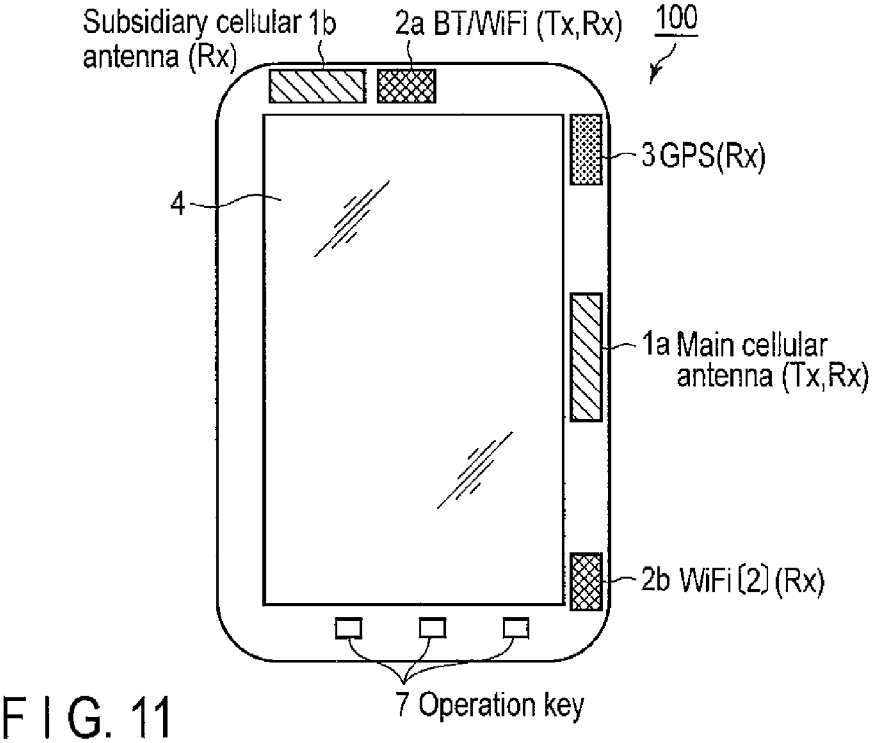
FIG. 11 is an exemplary diagram illustrating a first antenna arrangement example of an electronic apparatus according to a third embodiment.

FIG. 11 is an exemplary diagram illustrating an external appearance and antenna arrangement of an electronic apparatus 100 according to the present embodiment.

As illustrated in FIG. 11, the electronic apparatus 100 is provided with physical operation keys 7 in a peripheral portion of a touch panel display 4 in a front surface of a housing. In the electronic apparatus 100, a main cellular antenna 1*a*, a subsidiary cellular antenna 1*b*, a Bluetooth/WiFi antenna 2*a* and a WiFi [2] antenna 2*b* are arranged in sides which are different from a side where the operation keys 7 are arranged. In other words, two perpendicular sides, that is, a side in which the main cellular antenna 1*a* and the WiFi [2] antenna 2*b* are arranged and a side in which the Bluetooth/WiFi antenna 2*a* and the subsidiary cellular antenna 1*b* are arranged, are different from the side where the operation keys 7 are arranged.

Suppose that the operation keys 7 are operated while wireless communication is being performed. Arranging the antennas in the sides different from the side where the operation keys 7 are arranged can suppress deterioration in antenna characteristics of the antennas when the operation keys 7 are operated during wireless communication.

Figure 12:
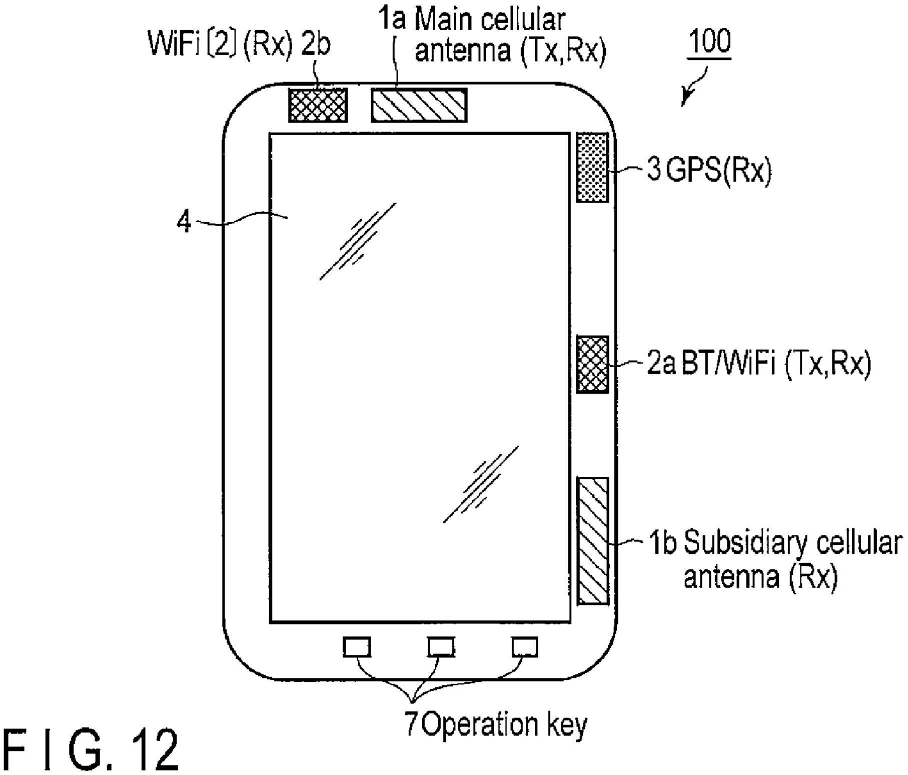
FIG. 12 is an exemplary diagram illustrating a second antenna arrangement example of the electronic apparatus according to the third embodiment.

In addition, as illustrated in FIG. 12, it is possible to exchange positions of the pair of the main cellular antenna 1*a* and the subsidiary cellular antenna 1*b* and the pair of the Bluetooth/WiFi antenna 2*a* and the WiFi [2] antenna 2*b*.

Fourth Embodiment

Next, a fourth embodiment will be explained hereinafter.

Figure 13:
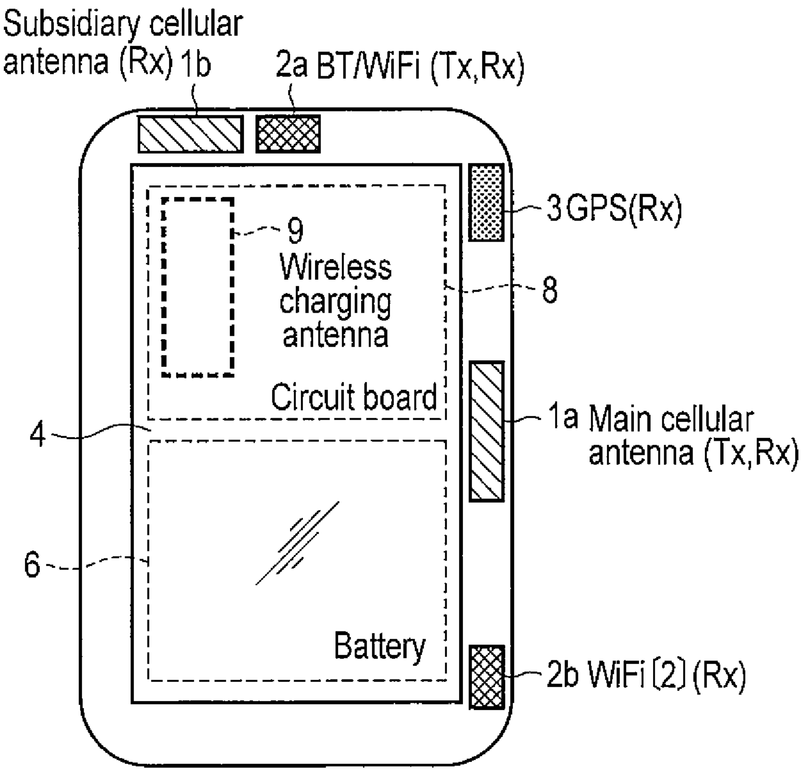
FIG. 13 is an exemplary exterior drawing for showing an example of mounting a wireless charging antenna on a circuit board in an electronic apparatus according to a fourth embodiment.

FIG. 13 is an exemplary diagram illustrating an external appearance and antenna arrangement of an electronic apparatus 100 according to the present embodiment.

Figure 14:
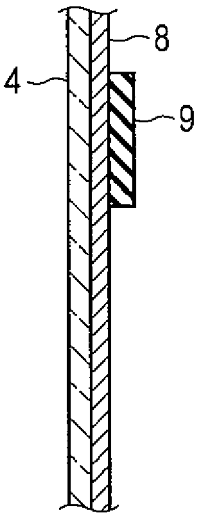
FIG. 14 is an exemplary partial cross-sectional view for showing the example of mounting the wireless charging antenna on the circuit board in the electronic apparatus according to the fourth embodiment.

The second embodiment described above shows an antenna arrangement example in the case where the charging connector 5 for inputting electrical energy for charging the battery 6 is disposed in the side surface of the housing. In comparison with this, the electronic apparatus 100 of the fourth embodiment includes a wireless charging antenna 9 for inputting electrical energy for charging a battery 6 in an electrically noncontacting state. When the wireless charging antenna 9 is contained in the housing, the wireless charging antenna 9 is placed on a back surface of a circuit board 8 in the electronic apparatus 100. FIG. 14 illustrates a partial cross-sectional view for illustrating an example of placing the wireless charging antenna 9 on the circuit board 8.

As illustrated in FIG. 14, the wireless charging antenna 9 is placed on a surface of the circuit board 8, which is reverse to a surface on which a touch panel display 4 is placed. Disposing the wireless charging antenna 9 on the back surface, which generally has lower circuit density than that of the front surface reduces heat radiated by the battery 6 to some extent. Thereby, the electronic apparatus 100 achieves suppression of deterioration (increase in life) of the battery 6.

Fifth Embodiment

Next, a fifth embodiment will be explained hereinafter.

Figure 15:
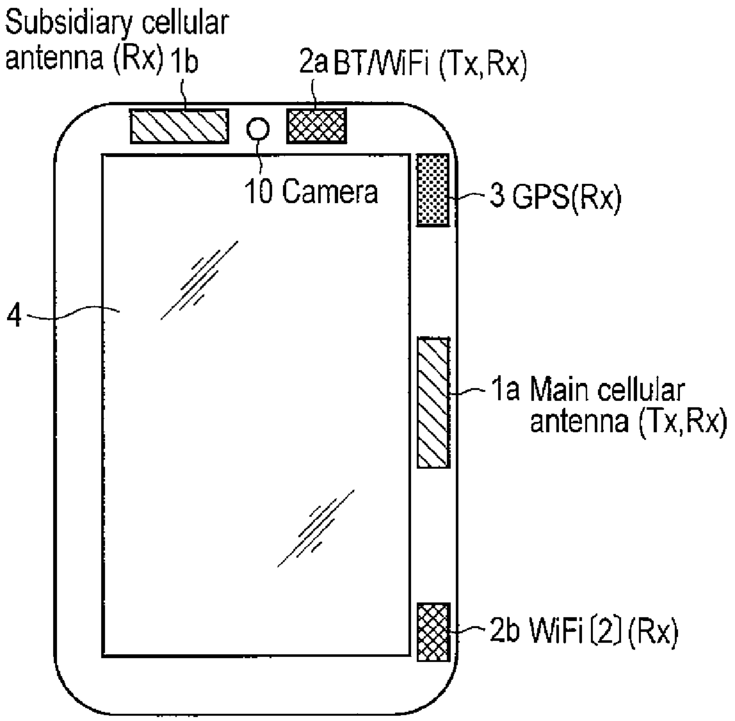
FIG. 15 is an exemplary diagram illustrating a first antenna arrangement example of an electronic apparatus according to a fifth embodiment.

FIG. 15 is an exemplary diagram illustrating an external appearance and antenna arrangement of an electronic apparatus 100 according to the present embodiment.

The first to fourth embodiment described above show examples where the two antennas of each wireless communication system are arranged in two perpendicular sides, and at least one antenna of each wireless communication system is disposed in a center part of a side.

On the other hand, there are increasing cases where portable electronic apparatuses such as the electronic apparatus 100 are equipped with a camera for capturing still and moving pictures. The camera is often disposed in a peripheral portion of the display screen and a center part of a side of the housing. In addition, the side where the camera is disposed is also a side (which is distant from the user's body) suitable for disposing antennas. Since the position of the camera takes priority over the positions of the antennas, the antennas cannot be disposed in the center part of the side where the camera is disposed. Specifically, it is impossible to dispose at least one antenna of each wireless communication system in the center part of the side, which is performed in the above first to fourth embodiments.

Figure 16:
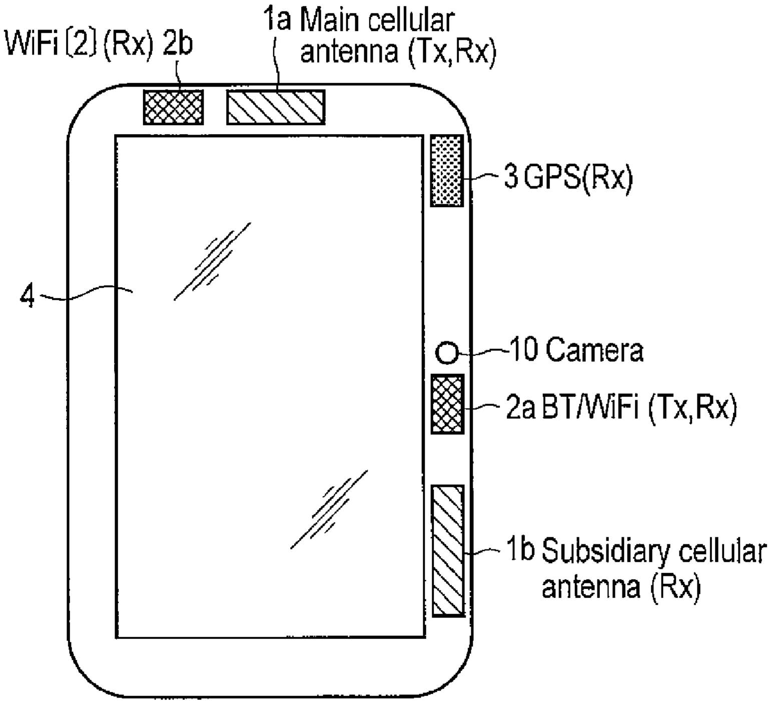
FIG. 16 is an exemplary diagram illustrating a second antenna arrangement example of the electronic apparatus according to the fifth embodiment.

In such a case, in the electronic apparatus 100, two antennas of a main cellular antenna 1*a* and a subsidiary cellular antenna 1*b* and two antennas of a Bluetooth/WiFi antenna 2*a* and a WiFi [2] antenna 2*b* are arranged in the side where a camera 10 is disposed and a side which is perpendicular to the side, and one antenna of one of the two pairs is disposed in a center part of the side which is perpendicular to the side where the camera 10 is disposed. In the example illustrated in FIG. 15, the main cellular antenna 1*a* is disposed in the center part of the side perpendicular to the side where the camera 10 is disposed. In addition, the Bluetooth/WiFi antenna 2*a* is disposed in the side where the camera 10 is disposed, and in the vicinity of the camera 10. As illustrated in FIG. 16, the positions of the pair of the main cellular antenna 1*a* and the subsidiary cellular antenna 1*b* and the pair of the Bluetooth/WiFi antenna 2*a* and the WiFi [2] antenna 2*b* can be exchanged with each other.

In the electronic apparatus 100, although one antenna of only one of the two wireless communication systems is disposed in the center part of the side (which is presumed to be rarely held in one hand), the two antennas of each wireless communication system are arranged in two perpendicular sides, and thereby at least one antenna can be maintained in a state of not being covered by a hand. Therefore, the electronic apparatus 100 according to the present embodiment can also realize suppression of deterioration in antenna characteristics in the case where the electronic apparatus is held by the user.

Sixth Embodiment

Next, a sixth embodiment will be explained hereinafter.

The fourth embodiment described above shows the case where the battery 6 is charged by use of the wireless charging antenna 9 which can input electrical energy in an electrically noncontacting state. Charging of the battery 6 by use of the wireless charging antenna 9 is performed by placing the electronic apparatus 100 in an expansion unit which includes a charging function and is called a “cradle”.

Figure 17:
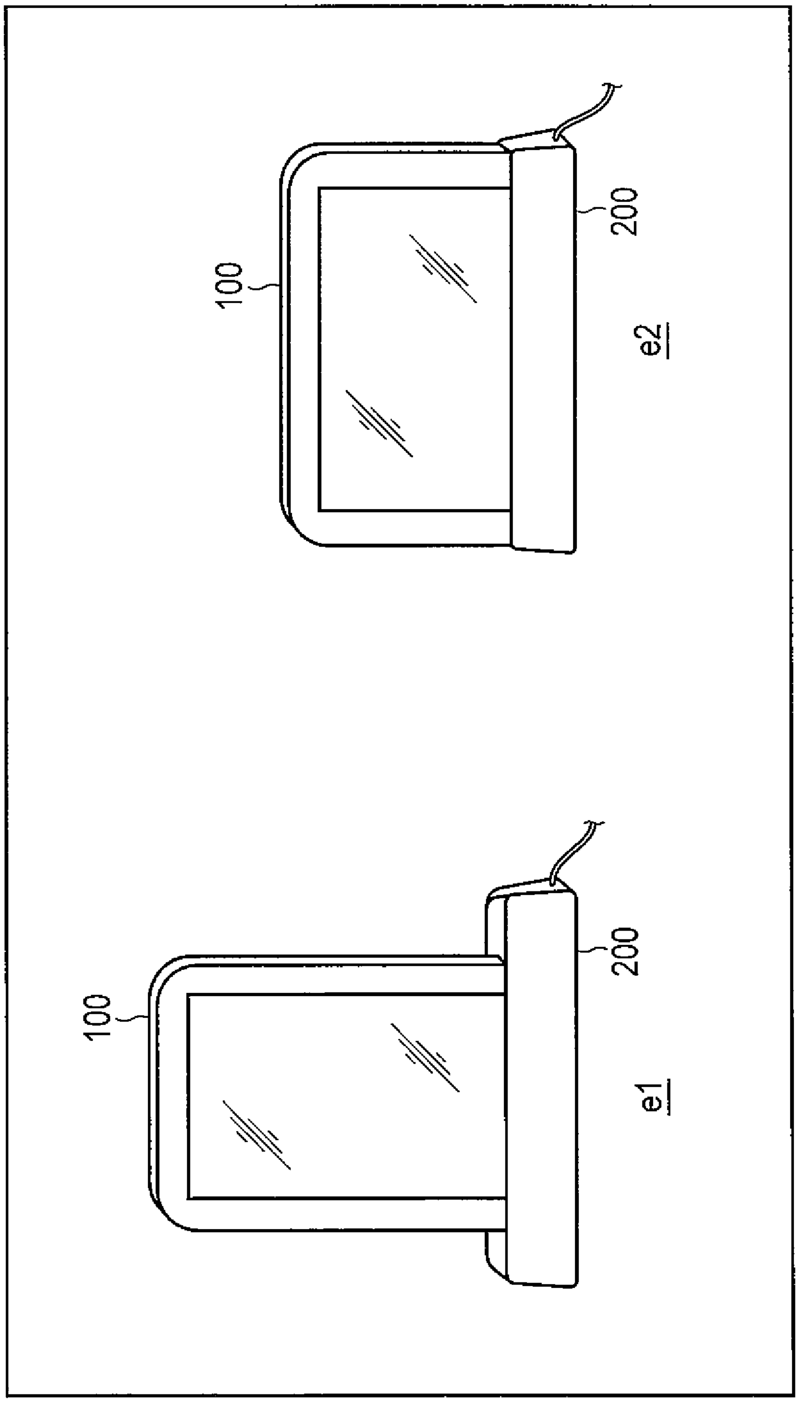
FIG. 17 is an exemplary diagram illustrating a state where an electronic apparatus according to a sixth embodiment is placed in an expansion unit with a charging function.

Suppose that the electronic apparatus 100 is used in a state of being placed in the expansion unit. As described above, in the electronic apparatus 100, the touch panel display 4 can be used both in portrait orientation and landscape orientation. In addition, the wireless charging antenna 9 can input electrical energy in an electrically noncontacting state. Therefore, to make the best use of this advantage, as illustrated in FIG. 17, it is desirable to form an expansion unit 200 such that the electronic apparatus 100 can be placed in the expansion unit 200 both in portrait (“e1” of FIG. 17) and landscape (“e2” of FIG. 17) orientations.

Figure 18:
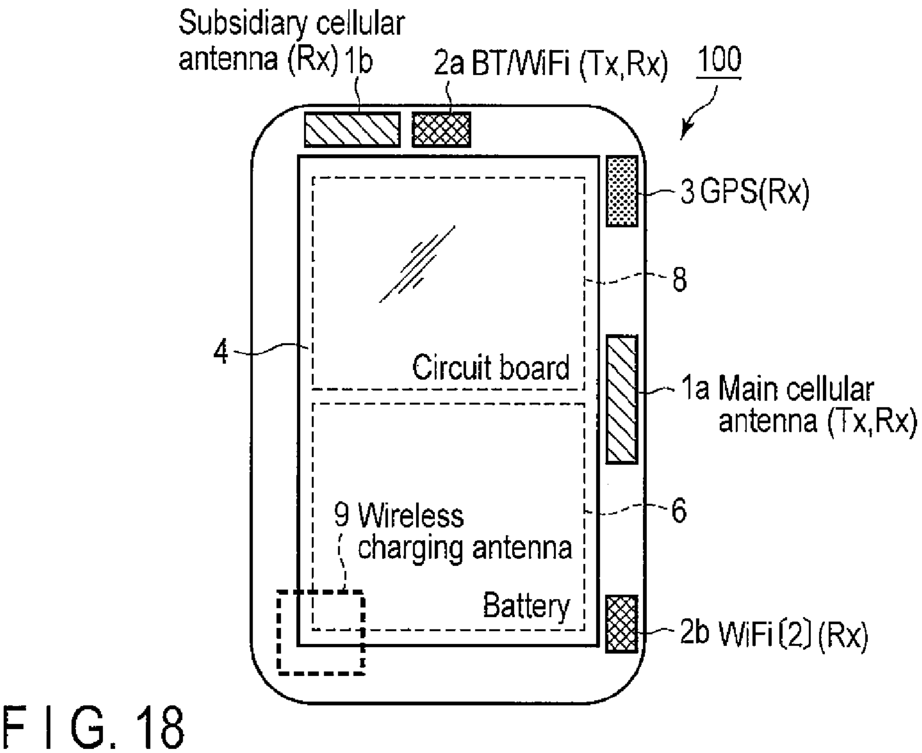
FIG. 18 is an exemplary first diagram illustrating an arrangement example of a wireless charging antenna of the electronic apparatus according to the sixth embodiment.
Figure 19:
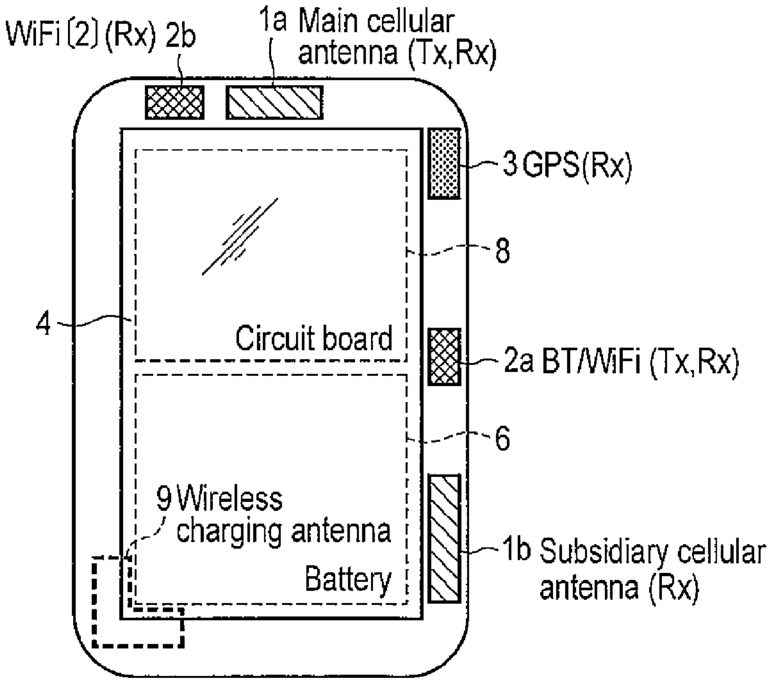
FIG. 19 is an exemplary second diagram illustrating an arrangement example of the wireless charging antenna of the electronic apparatus according to the sixth embodiment.

Therefore, as illustrated in FIG. 18 and FIG. 19, the electronic apparatus 100 of the present embodiment has a structure in which a wireless charging antenna 9 is disposed in a corner which is opposed to a corner at which two perpendicular sides provided with two antennas of each wireless communication system cross each other. FIG. 18 illustrates an example in which the wireless charging antenna 9 is formed as a rectangle, and FIG. 19 illustrates an example in which the wireless charging antenna 9 is formed in an L-shape. By forming the wireless charging antenna 9 as a rectangle or in an L-shape, any side of the wireless charging antenna 9 runs along both of two sides which cross at the corner where the wireless charging antenna 9 is disposed. Therefore, the battery 6 can be charged through the wireless charging antenna 9, even when any of the two sides which cross at the corner where the wireless charging antenna 9 is disposed is disposed at the bottom when the electronic apparatus 100 is placed in the expansion unit 200.

In addition, by disposing the wireless charging antenna 9 in the position (the corner which is opposed to the corner at which the two perpendicular sides provided with the two antennas of each wireless communication system cross each other), the antennas disposed in the center parts of the sides are not covered by the expansion unit 200, even when the electronic apparatus 100 in either portrait or landscape orientation is placed in the expansion unit 200.

Although the above fourth embodiment shows the example where the wireless charging antenna 9 is placed on the back surface of the circuit board 8, the wireless charging antenna 9 is not necessarily placed on the circuit board 8. For example, the wireless charging antenna 9 may be disposed on an internal wall on the back surface side of the housing, and may be connected to the circuit board 8 by a harness or a coaxial cable.

As described above, the electronic apparatus 100 can realize arrangement of the wireless charging antenna 9 which can perform charging regardless of the placement orientation of the electronic apparatus 100, and can realize suppression of deterioration in antenna characteristics in the state of being placed in the expansion unit 200, as well as the case of being held by the user.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:

a display device with a display screen, the display screen exposed from a front surface of a housing;

a first wireless communication module;

a second wireless communication module;

first antennas for the first wireless communication module; and second antennas for the second wireless communication module, wherein:

at least two of each of the first antennas and the second antennas are disposed in two perpendicular sides of the housing, the two perpendicular sides being peripheral parts of the display screen, and one of the first antennas disposed in the two perpendicular sides and one of the second antennas disposed in the two perpendicular sides are disposed in respective center parts of the two perpendicular sides.

2. The apparatus of claim 1, wherein the one of the first antennas disposed in the center part of a first side of the two perpendicular sides and the one of the second antennas disposed in the center part of a second side of the two perpendicular sides comprise antennas for transmission or antennas for transmission and reception.

3. The apparatus of claim 2, wherein:

the other first antenna than the one of the first antennas disposed in the center part of the first side of the two perpendicular sides is disposed in a first part of the second side of the two perpendicular sides, the first part is distant from the first side of the two perpendicular sides beyond the center part where the one of the second antennas is disposed, and the other second antenna than the one of the second antennas disposed in the center part of the second side of the two perpendicular sides is disposed in a second part of the first side of the two perpendicular sides, the second part is distant from the second side of the two perpendicular sides beyond the center part where the one of the first antennas is disposed.

4. The apparatus of claim 1, wherein the other first antenna than the one of the first antennas disposed in the center part of the first side of the two perpendicular sides and the other second antenna than the one of the second antennas disposed in the center part of the second side of the two perpendicular sides comprise antennas for reception.

5. The apparatus of claim 1, further comprising:

a battery; and a connector configured to receive electrical energy used for charging the battery, wherein either the first side of the two perpendicular sides or the second side of the two perpendicular sides comprises a side of the housing, which is opposed to a side of the housing, in which the connector is disposed.

6. The apparatus of claim 1, further comprising an operation key mounted on the front surface of the housing, wherein the first side of the two perpendicular sides and the second side of the two perpendicular sides comprise sides of the housing, which are different from a side of the housing, in which the operation key is disposed.

7. The apparatus of claim 1, further comprising:

a battery; and a wireless charging antenna configured to charge the battery in an electrically noncontacting state, wherein the wireless charging antenna is disposed in a corner of the housing, the corner being opposed to a corner of the housing, at which the first side of the two perpendicular sides and the second side of the two perpendicular sides cross each other.

8. The apparatus of claim 7, wherein the wireless charging antenna is formed as a rectangle, and is disposed such that a first side of the wireless charging antenna runs along a side of the housing, which is opposed to the first side of the two perpendicular sides, and a second side of the wireless charging antenna which is perpendicular to the first side of the wireless charging antenna runs along a side of the housing, which is opposed to the second side of the two perpendicular sides.

9. The apparatus of claim 7, wherein the wireless charging antenna is formed in an L-shape with a first part and a second part that is perpendicular to the first part, and is disposed such that the first part of the wireless charging antenna runs along a side of the housing, which is opposed to the first side of the two perpendicular sides, and the second part of the wireless charging antenna runs along a side of the housing, which is opposed to the second side of the two perpendicular sides.

10. An electronic apparatus comprising:

a display device with a display screen, the display screen exposed from a front surface of a housing;

a first wireless communication module;

a second wireless communication module;

first antennas for the first wireless communication module; and second antennas for the second wireless communication module, wherein:

at least two of each of the first antennas and the second antennas are disposed in two perpendicular sides of the housing, the two perpendicular sides being peripheral parts of the display screen, and either one of the first antennas disposed in the two perpendicular sides or one of the second antennas disposed in the two perpendicular sides is disposed in a center part of one of the two perpendicular sides.

11. The apparatus of claim 10, wherein the either one of the first antennas disposed in the two perpendicular sides or one of the second antennas disposed in the two perpendicular sides, which is disposed in the center part of one of the two perpendicular sides comprises an antenna for transmission or an antenna for transmission and reception.

* * * * *